O. J. MITCHELL.
COMBINED WAGON AND HEARSE BODY FOR MOTORS WITH MOVABLE ATTACHMENTS.
APPLICATION FILED APR. 4, 1918.
1,312,561.  Patented Aug. 12, 1919.
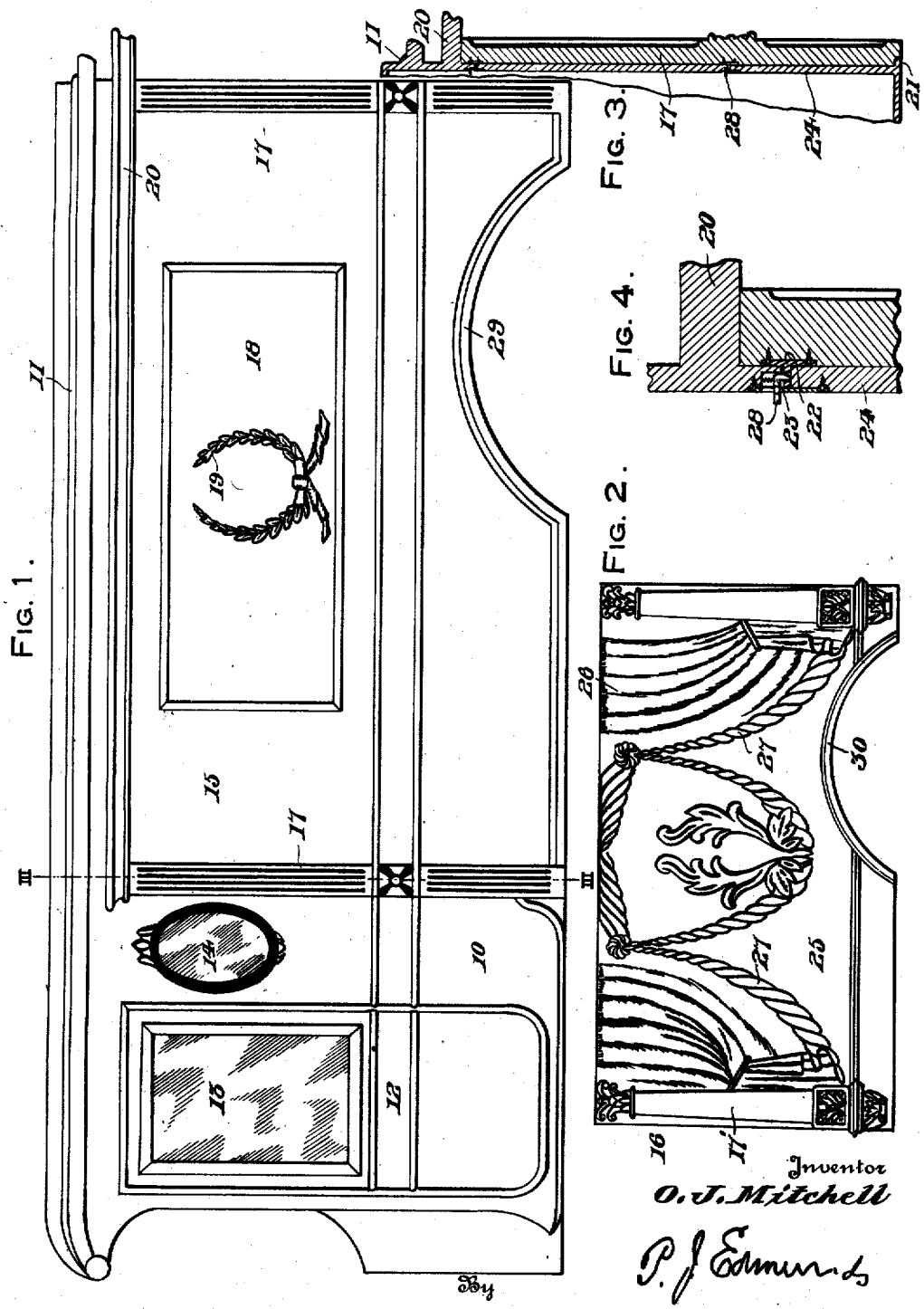

UNITED STATES PATENT OFFICE.

OSCAR J. MITCHELL, OF INGERSOLL, ONTARIO, CANADA.

COMBINED WAGON AND HEARSE BODY FOR MOTORS WITH MOVABLE ATTACHMENTS.

1,312,561.  Specification of Letters Patent.  Patented Aug. 12, 1919.

Application filed April 4, 1918. Serial No. 226,787.

*To all whom it may concern:*

Be it known that I, OSCAR J. MITCHELL, a subject of the King of Great Britain, and a resident of the town of Ingersoll, in the county of Oxford, in the Province of Ontario, Canada, have invented a new and useful Combined Wagon and Hearse Body for Motors with Movable Attachments, of which the following is a specification.

The invention relates to certain new and useful improvements in combined casket wagon and hearse body for motor vehicles.

The primary object of the invention is the provision of a motor vehicle body adapted for use by funeral directors readily convertible at will into either a casket wagon or a hearse, whereby one vehicle will take the place of two vehicles ordinarily employed.

A further object of the invention is to provide a casket wagon serviceable for funerals arranged with a ready means for changing the external appearance thereof into the form of an elaborately decorated hearse, the arrangement being economical for the funeral director rendering a full equipment less expensive.

It will be understood that a funeral director ordinarily employs a separate casket wagon and hearse, either motor-operated or otherwise and by the employment of my device a single motor or horse-driven vehicle is readily and quickly converted into a hearse or casket wagon, the appearance of which when arranged for use having a complete and finished appearance, serving all of the functions and uses to which the separate vehicles are capable.

With these general objects in view and others that will appear as the nature of the invention is better understood, the same consists in the novel construction, combination and arrangement of parts hereinafter fully described, illustrated in the accompanying drawing and pointed out in the appended claim.

In the drawing forming a part of this application and in which like numerals refer to corresponding parts throughout the several views;—

Figure 1 is a side elevation of a vehicle body formed after the manner of my invention illustrating the same arranged as a casket wagon;

Fig. 2 is an elevational view upon a reduced scale of a removable panel adapted for employment upon the sides of the vehicle for converting the same into a hearse;

Fig. 3 is a vertical transverse sectional view of a side portion of the device taken upon line 3—3 of Fig. 1 and illustrating the panel-attaching means; and Fig. 4 is an enlarged sectional detail view of the upper portion of a panel further illustrating the attaching means for the panel.

Referring more in detail, a covered vehicle body 10 is illustrated having a top 11, forwardly arranged driver's cab 12 with side windows 13 and 14 after the usual manner of a hearse or casket wagon, the said body 10 being serviceable for mounting upon a chassis when the device is employed as a motor vehicle or upon a suitable running gear when desired for use as a horse-drawn vehicle.

The invention broadly consists of removable side panels 15 detachably positioned upon the wagon body 10 for forming the opposite sides thereof when the device is employed as a casket wagon and also providing panels 16 for similar employment when the device is desired for use as a hearse.

It is believed unnecessary to more particularly describe the panels 15 and 16 for the reason that the same may be arranged of more or less elaborate design according to the requirements of the funeral director having the same for use. The panel 15 illustrates a somewhat usual design for the formation of a side of a casket wagon preferably having end posts 17 and a plate glass portion 18 having a form of wreath 19 represented thereon. An outwardly projecting molding 20 is horizontally arranged upon each side of the body 10 slightly below the top 11 thereof and the panels 15 and 16 are adapted for seating the lower edges of the panels upon an outwardly projecting ledge 21 at the lower edge of the body 10 and then swung rearwardly with the top of whichever panel is employed closely fitting beneath the molding 20 as best illustrated in Fig. 3 of the drawing.

Attaching plates 22 are arranged upon the rear face of each of the panels 15 and 16 adapted for automatic engagement by spring-pressed hooks 23 carried by the adjacent side portion 24 of the body 10, it being understood that when a panel is flatly engaged with the side portion 24 of the body that the hooks 23 will automatically engage the plates 22, thereby retaining the panel in its vertical operative position forming the side of the wagon. It is also to be noted that the side portions 24 of the wagon body 10 do not underlie the entire panel when operatively arranged but are only positioned back of the posts 17 of the panel 15 and the similar end posts 17¹ of the panel 16. By this arrangement the glass insert or window 18 of the panel 15 provides for visual access interiorly of the wagon body when the device is employed as a casket wagon, while the main portion 25 of the panel 16 may be formed of glass rendering the interior of the wagon body plainly visible when the device is employed as a hearse, suitable curtain and cordage festoons 26 and 27 being employed rearwardly of the glass 25 in substantially the usual manner if desired.

As many of the attaching means may be employed as found desirable for insuring the securing of the desirable panels upon the wagon body 10 so that the panels will not become detached during the travel of the vehicle, two of the same being deemed sufficient as herein illustrated in connection with each of the panel posts. When it is desired to remove one of the panels 15 or 16 from the body 10, the retaining means are released by downward pressure exerted upon the inwardly extending ends of lever portions 28 of the hooks 23, thereby releasing the said hooks from the plates 22 and permitting the panel to be removed so that another panel may be readily positioned for taking its place. A wheel accommodating cut out portion 29 is provided in the lower edge of each of the panels 15 and similar arrangement 30 is provided in the panels 16. A serviceable combination body is arranged of economic value to funeral directors and while one embodiment of the invention is herein set forth, it will be understood that many changes may be made therein in details of construction without departing from the spirit and scope of my invention as herein set forth in the claim.

What I claim as new is:—

In combination with a covered body having an outwardly projecting bottom ledge and an outwardly projecting molding adjacent the top of the body, an ornamental panel closely fitting between the said ledge and molding when arranged for use and detachable connections between the wagon body and panel adapted for automatic engagement with the panel when placed in position flatly engaging the wagon body, and releasing means for said connections arranged interiorly of the wagon body.

In testimony whereof I have signed in the presence of the two undersigned witnesses.

OSCAR J. MITCHELL.

Witnesses:
T. J. EDMUNDS,
M. A. EDMUNDS.

Copies of this patent may be obtained for five cents each, by addressing the "Commissioner of Patents, Washington, D. C."